Dec. 13, 1966  P. F. M. GAMBS  3,290,927
OPHTHALMOMETER HAVING AFOCAL LENS SYSTEM
Filed July 6, 1959  2 Sheets-Sheet 1
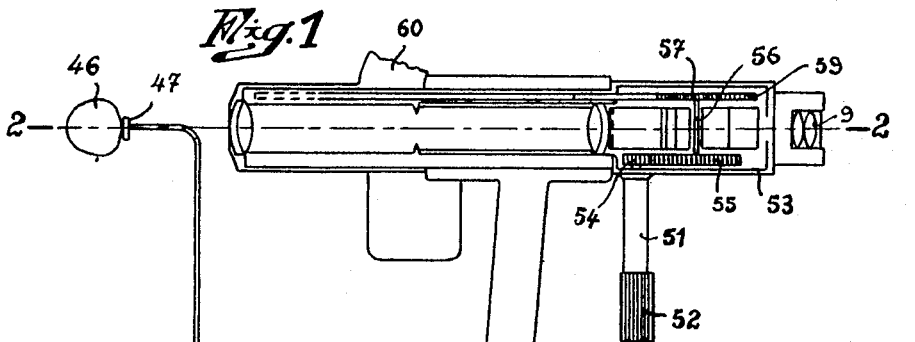
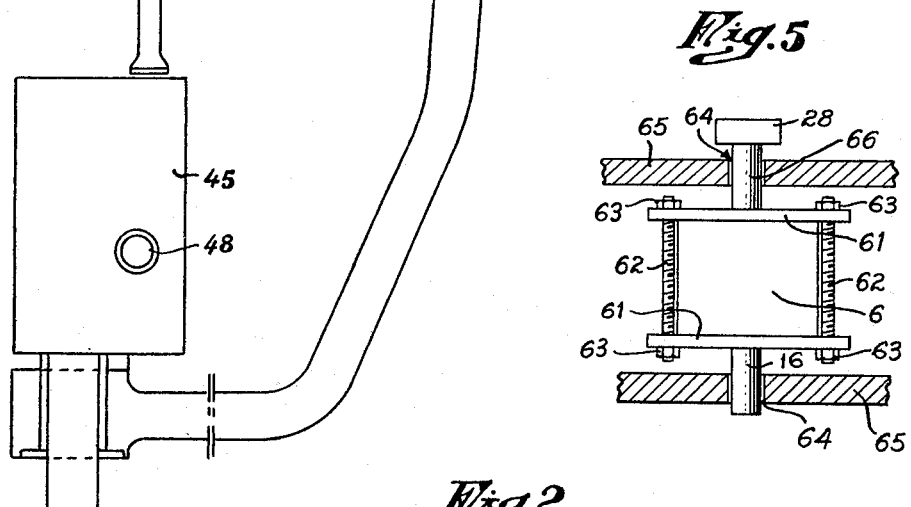
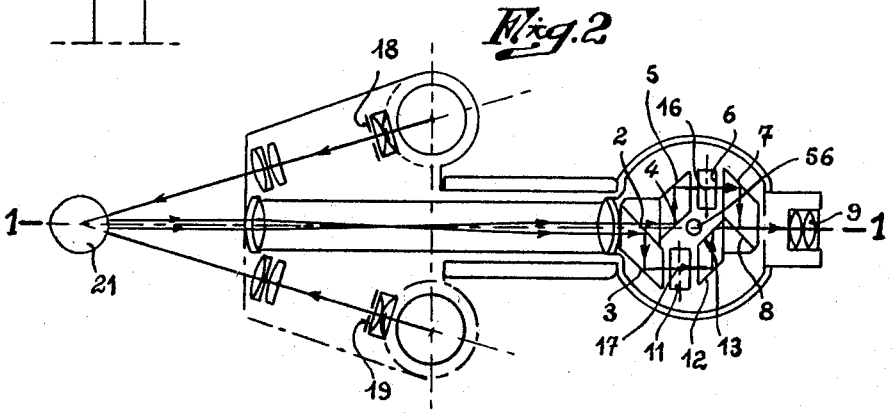
INVENTOR:
PAUL FRÉDÉRIC MARIE GAMBS
BY
Richardson, David and Verdon
ATTORNEYS.

Dec. 13, 1966   P. F. M. GAMBS   3,290,927
OPHTHALMOMETER HAVING AFOCAL LENS SYSTEM
Filed July 6, 1959   2 Sheets-Sheet 2
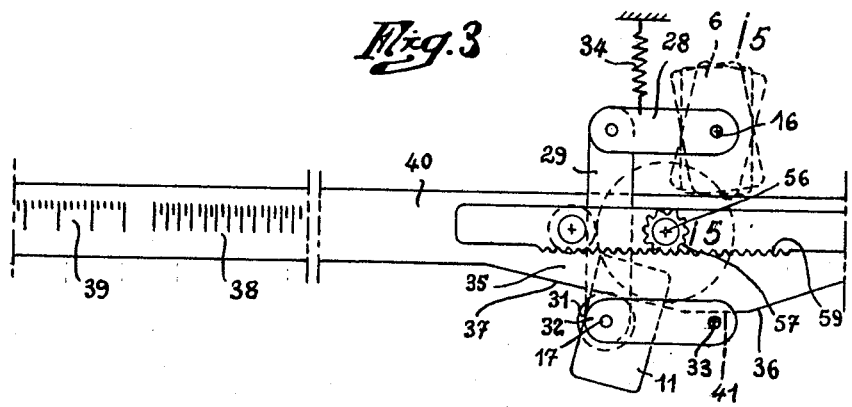
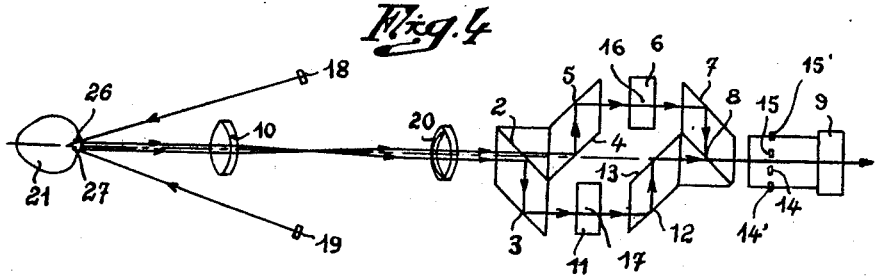
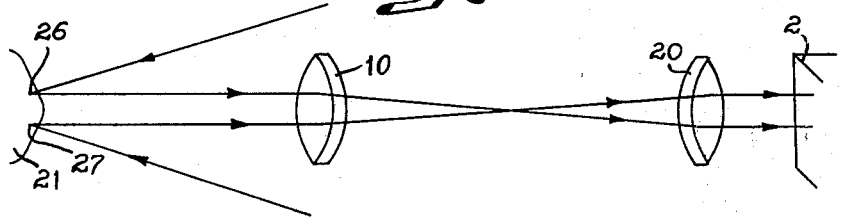
INVENTOR:
PAUL FRÉDÉRIC MARIE GAMBS
BY
Richardson, David and Nerdon
ATTORNEYS.

United States Patent Office 3,290,927
Patented Dec. 13, 1966

3,290,927
OPHTHALMOMETER HAVING AFOCAL
LENS SYSTEM
Paul Frederic Marie Gambs, 4 Rue President Carnot,
Lyon, France
Filed July 6, 1959, Ser. No. 825,305
Claims priority, application France, Dec. 26, 1958,
38,966, Patent 1,211,981
4 Claims. (Cl. 73—80)

The image duplicating system located in front of the objective of Helmholtz' ophthalmometer is constituted by two blades of glass provided with parallel surfaces and revolving in opposite directions. Such an ophthalmometer shows the advantage of providing coincidence between two sighting operations in parallel directions. In particular, the linear spacing between the images which are brought into register is independent of the focusing distance. However, the two blades are merely juxtaposed in front of the objective and this results in a cutting out of parts of the pupil images.

The parallactic effect due to this cutting out of the pupil images is not detrimental to the accuracy of the measurements, since it acts perpendicularly to the direction of duplication, but it prevents the use of the apparatus for many practical purposes, in particular for the definition of the principal cross-sections of an astigmatic cornea, as provided through the alignment of the images of the sighting marks.

My improved ophthalmometer described hereinafter includes also a duplicating system constituted by blades provided with parallel surfaces; the beam of luminous rays is fractionated no longer through the juxtaposition of the two blades but through the insertion of a semi-transparent, semi-reflecting surface. Each of the two bundles thus obtained is directed by a set of reflecting surfaces or the like system onto a blade provided with parallel surfaces following which another set of reflecting surfaces and a second semi-transparent, semi-reflecting surface reform the luminous beam. The images of the pupils are no longer partly cut out. Such an apparatus retains thus the advantage inherent to Helmholtz' measuring principle, to wit, the parallelism between the two sighting directions which makes the linear spacing between the images to be superposed independent of the focusing distance.

In the ophthalmometer forming the object of the invention, an afocal combination retaining parallelism between the two sighting directions is constituted by an optical system wherein the two optical elements providing for the formation of the intermediate images of the sighting marks are arranged in a manner such that the image focus of the former registers with the focus object of the second element.

It is also possible to make the reflected images of the sighting marks register with the object focus of the first optical element so that their intermediate images are located at the image focus of the second optical element, which furthers the adjustment of the instrument by the builder.

The accompanying diagrammatic drawings illustrate by way of examples various embodiments of my ophthalmometer. In said drawings:

FIG. 1 is a vertical cross-section through line 1—1 of FIG. 2.

FIG. 2 is a horizontal cross-sectional view through line 2—2 of FIG. 1.

FIG. 3 is, on a larger scale, a plan view of the scale and of the parts associated therewith.

FIG. 4 illustrates, after removal of the casing, box or support, the different elements forming the optic system in elevational side view, together with the two mires or sighting marks.

FIG. 5 is a cross-section on an enlarged scale through line 5—5 of FIG. 3, showing the mechanism controlling the rotary movement of one of the parallel-sided plates.

FIG. 6 shows, on an enlarged scale, the afocal section of the optic system in a plane perpendicular to the plate of FIG. 4.

It should first be remarked that the optic system of my improved ophthalmometer includes in front of the location of the patient's eye an afocal lense system 10–20 which is entirely independent of the image-doubling system lying between said afocal system producing a parallel beam and the practitioner's eyepiece 9. This image-doubling system 2–13 is thus of a small breadth and bulk and produces the duplicate images required of the mires or sighting marks 18 and 19.

I will now describe with further detail said image-doubling system which includes:

A first surface 2 (FIGS. 2 and 4) which is semi-reflecting and semi-transparent and extends across the whole luminous beam and returns half its intensity in the direction of the surface 3 while the other half passes through the surface 2 in the direction of the surface 4 and is reflected by said surface 4 and the surface 5 and then passes through the blade 6 having parallel surfaces so as to be reflected from the surface 7 and to impinge on a second surface 8 which is semi-reflecting and semi-transparent and directs the beam into the eyepiece 9 with half its intensity while the other half passes through said surface 8 and is lost.

Similarly, the half beam reflected by the surface 2 continues its progression towards the surfaces 3, 11, 12 and 13. It impinges then on the semi-reflecting and semi-transparent surface 8 which transmits one half of the intensity of the beam towards the eyepiece 9 while the other is reflected and is lost. (See the arrows.)

Each of the sighting marks 18 and 19 produces on the cornea of the patient an image respectively at 26 and at 27 (FIG. 4). Each of said images produces in its turn through the optical elements 10 and 20 and the duplicating system described hereinabove two pairs of images respectively 14–14′ and 15–15′. The measurement is executed by superposing the images 14 and 15 (FIG. 4) which are visible through the eyepiece 9.

To this end, the slope of the blades 6 and 11 is caused to vary with reference to the beams passing through them as provided by rotating the blades round axes, respectively 16 and 17, which are perpendicular to the plane defined by the lines connecting the sighting marks 18 and 19 with the patient's eye to be examined, which eye is shown at 21.

The rotation of the parallel-sided transparent plate 6 is obtained as follows: the plate 6 appearing as a rectangular parallelipipedon is damped between two flanges 61, for instance by two tie-pieces 62 which are screwed into four nuts 63. The two flanges are each rigid with a half-spindle 16 and a half-spindle 66 which are alined, revolve in corresponding alined ports 64 formed in the frame 65 of the apparatus or of a plate carried inside the latter. The half-spindle 66 is rigid with the lever 28. The general direction of the light beam passing through the plate 6 is perpendicular to the plane of FIG. 6.

In the embodiment illustrated, only the blade 6 is movable for measuring purposes while the other blade 11 which provides compensation for the action of the blade 6 on the focusing distance remains stationary.

A possible sloping of the blade 11 with reference to its axis 17 may serve for instance for correcting the adjustment of the arrangement.

In other embodiments which are not illustrated, it is just as convenient to resort to measuring systems acting on both blades 6 and 11 or to a quick-acting system shifting the blade 6 for approximate measurements associated with a slow-acting system shifting the blade 11 for more accurate measurements.

Furthermore, it is possible to associate the different optical elements of the ophthalmometer in a manner such that the linear duplication of the two sighting directions to be returned into registry may serve for measuring other magnitudes, for instance the spacing of the images resorted to for measurement of the depth of the front chamber or of its diameter.

In particular, it is possible to define a position of the measuring system such that the linear duplication of the images observed may be equal to the diameter of the cornea surface to be examined in the so-called aplanation tonometric technique.

It is then possible to make the ophthalmometer more complete by associating therewith an aplanation tonometer (FIG. 1) acting on the cornea 46 through a plate 47 of transparent material including no measuring system, said plate being controlled mechanically by the knob 48 with the interposition of a spring.

Such a tonometer or instrument for measuring intraocular pressure is adapted to measure, for instance through a conventional dynamometric arrangement, the force required for flattening a well-defined surface of the patient's cornea; this is obtained by applying over said cornea a member having a flat surface and which is generally transparent, so as to allow observation of the contact surface with the cornea. According as to whether the cornea is part-spherical or tore-shaped, said contact surface is circular or slightly elliptic and it is necessary to measure accurately its diameter or its mean or major radius. It is sufficient, to this end, to provide a reference mark on the ophthalmometer scale or scales, which mark corresponds to a spacing of the doubled images which is equal to the diameter $\epsilon$ of the flattening surface which is conventionally used for tonometric purposes.

The operator observes, through the ophthalmometer adjusted for this position of the scale, the cornea on which he applies the contact member incorporated with the tonometer. The contacting circle or ellipse on the cornea appears as duplicated. The operator then increases the pressure exerted on the eye, until the two circles or ellipses observed are tangent and it is sufficient to read on the dynamometric arrangement of the tonometer the value of the pressure exerted on the eye.

When it is desired to execute such measurements by flattening cornea surfaces of different areas, it is sufficient to resort to a chart giving out, for each position of the scale or scales, the value of the diameter of the circles or of the major radius of the ellipses observed and this will define immediately the flattened area. The advantage of associating such an aplanation tonometer with the ophthalmometer resides in the fact that in the case of an astigmatic or toric cornea, the data required for setting the measuring means along the meridian line or axis passing through the mean radius of the flattened ellipse are actually given by the ophthalmometer.

Turning to FIGS. 1 to 3, I will now describe the mechanism controlling the angular adjustment of the plate 6 round the axis 16 by connecting the plate 6 pivotally with a lever 28 pivotally connected in its turn with a link 29 carrying a roller 31 at its further end 32, which end is pivotally connected with the end of a further lever pivoting round a stationary point 33. Said roller 31 is urged by the spring 34 against the rod 40 moving in parallelism with the optical axis of the ophthalmometer for operation of the latter. The shifting of the roller 31 thus obtained over the rod 40 when the latter is shifted by the operator, modifies consequently the angular setting of the plate 6.

The rod 40 is controlled to this end by a rotary rod 51, the outer end of which carries the knob 52 within reach of the operator. Said rod enters the inside of the casing 53 and carries at its upper end the wheel 54 meshing with a toothed plate 55 rigid with the lower end of a shaft 56. The latter, which extends between the two sections of the image-doubling system which has just been described, perpendicularly to the direction of progression of the beam, carries at its end remote from the plate 55 a toothed wheel 57 meshing with a rack 59 rigid with the control rod 40.

The outline of the rod 40 includes two cam sections 36 and 37 corresponding respectively with the scales of dioptres 38 and of radii of curvature 39. These scales may be provided, as desired, with equidistant or non-equidistant subdivisions. The cooperation between the rod 40 and the roller 31 upon shifting of the rod by the knob 52 allows reading on said scales 38 and 39 the values of the dioptres and of the radii of curvature corresponding to any angular setting of the plate 6 assumed to ensure coincidence between the images of the two sighting marks in the eyepiece.

When operating with an aplanation tonometer, I may provide reference marks located preferably between the two above-mentioned cam sections.

For instance, in the case of FIG. 3, the two cam sections are interconnected by a straight outline section 41 parallel with the direction of movement of the rod 40.

These reference marks cooperate with a stationary scale, whereby it is possible to ascertain the position of the rod 40 and, consequently, of the plate 6 for which the spacing of the duplicated images is equal to the diameter of the cornea surface when flattened by a tonometer plate associated with the ophthalmometer.

The casing of the apparatus is provided with an opening 60 under which the rod 40 may be shifted, so that the operator may read through said opening the scales showing the desired measurement.

Obviously, my invention is by no means limited to the sole embodiment which has been described hereinabove for said ophthalmometer and it covers all the modifications thereof falling within the scope of the accompanying claims. In particular, instead of a rectilinear shifting of the cam and of scale intervals corresponding to rectilinear shiftings, it is also possible to provide a circular cam adapted to turn around a spindle rigid with an annular scale.

What is claimed is:

1. In an ophthalmometer, the combination of two mires lying in a plane passing through the location of the line of vision for the patient's eye, symmetrically of said line and to the front of the location of the patient's eye, an afocal optic system lying along the location of said line of vision to the front of the location of the patient's eye and an image-doubling system extending on the side of the afocal system opposed to said location of the patient's eye and including a first beam-splitting surface and two series of reflecting surfaces adapted to act on each fraction of the split beam passing out of the first surface, two parallel-sided transparent plates inserted each in the path of the beam fraction passing through the corresponding series of reflecting surfaces, an eyepiece located directly beyond the image-doubling system adapted to collect at least part of each fraction of the split beam for simultaneously observing the images of the mires reflected by the patient's cornea and passing through the afocal system and through the corresponding series of reflecting surfaces and associated parallel-sided plates, means for adjusting the relative angular setting of the two parallel-sided plates.

2. In an ophthalmometer, the combination of two mires lying in a plane passing through the location of the line of vision for the patient's eye, symmetrically of said line and to the front of the location of the patient's eye, an afocal optic system lying along the location of said line of vision to the front of the location of the patient's eye and an image-doubling system extending on the side of the afocal system opposed to said location of the patient's eye and including a first beam-splitting surface and two series of reflecting surfaces adapted to act on each fraction of the split beam passing out of the first surface, two parallel-sided transparent plates inserted each in the path of the beam fraction passing through the corresponding series of reflecting surfaces, an eyepiece located directly beyond the image-doubling system adapted to collect at least part of each fraction of the split beam for simultaneously observing the images of the mires reflected by the patient's eye and passing through the afocal system and through the corresponding series of reflecting surfaces and associated parallel-sided plates and means for adjusting the relative angular setting of the two parallel-sided plates, a cam-carrying member controlling last-mentioned means, and scales carried by said member and defining respectively the dioptre powers and the angles of curvature of the cornea under examination.

3. In an ophthalmometer adapted to be used with a tonometer including a tonometric plate, the combination of two mires lying in a plane passing through the location of the lines of vision for the patient's eye, symmetrically of said line and to the front of the location of the patient's eye, an afocal optic system lying along the location of said line of vision to the front of the location of the patient's eye and an image-doubling system extending on the side of the afocal system opposed to said location of the patient's eye and including a first beam-splitting surface and two series of reflecting surfaces adapted to act on each fraction of the split beam passing out of the first surface, two parallel-sided transparent plates inserted each in the path of the beam fraction passing through the corresponding series of reflecting surfaces, an eyepiece located directly beyond the image-doubling system adapted to collect at least part of each fraction of the spit beam for simultaneously observing the images of the mires reflected by the patient's cornea and passing through the afocal system and through the corresponding series of reflecting surfaces and associated means for adjusting the relative angular setting of the two parallel-sided plates, a cam-carrying member controlling last-mentioned means and scales carried by said member and defining respectively the dioptre powers and the angles of curvature of the cornea under examination, a reference mark carried by the cam-carrying member and defining a point of the latter for which the images obtained through the doubling system are spaced by a distance equal to the diameter of the cornea surface flattened by the tonometric plate associated with the ophthalmometer.

4. An optic system for an ophthalmometer including two mires, comprising an afocal optic system adapted to be illuminated by a beam carrying the image of the mires reflected by the patient's cornea, an image-doubling system on the outlet side of the afocal system and including a beam-splitting surface, reflecting surfaces returning the two fractions of the beam passing out of the beam-splitting surface substantially into the original direction of the beam illuminating the afocal system and two parallel-sided transparent plates inserted in the path of each fraction of the beam, means for adjusting the relative angular setting of said two plates, and an eyepiece at the output end of the image-doubling system for the observation of the doubled images of the mires passing through the afocal system and the image-doubling system.

References Cited by the Examiner

FOREIGN PATENTS 627,621    3/1936    Germany.
861,932    1/1953    Germany.

OTHER REFERENCES

"Fundamental Requirements in Ophthalmometer Design," article by Degenhardt in The Optician, vol. CXXIV, No. 3213, Oct. 31, 1952, pp. 381–384 cited.

DAVID H. RUBIN, *Primary Examiner.*

FREDERICK M. STRADER, E. G. ANDERSON,
*Examiners.*

T. L. HUDSON, *Assistant Examiner.*